(12) United States Patent
Oda et al.

(10) Patent No.: US 8,069,734 B2
(45) Date of Patent: *Dec. 6, 2011

(54) MULTI-VORTEX FLOWMETER INTEGRATING PRESSURE GAUGE

(75) Inventors: Shinji Oda, Tokyo (JP); Kenichi Takai, Tokyo (JP); Kohji Takahashi, Tokyo (JP)

(73) Assignee: Oval Corporation, Tokyo (JP)

( * ) Notice: Subject to any disclaimer, the term of this patent is extended or adjusted under 35 U.S.C. 154(b) by 89 days.

This patent is subject to a terminal disclaimer.

(21) Appl. No.: 12/225,884

(22) PCT Filed: Apr. 23, 2007

(86) PCT No.: PCT/JP2007/059281
§ 371 (c)(1),
(2), (4) Date: Aug. 5, 2009

(87) PCT Pub. No.: WO2007/145037
PCT Pub. Date: Dec. 21, 2007

(65) Prior Publication Data
US 2009/0301219 A1    Dec. 10, 2009

(30) Foreign Application Priority Data
Jun. 13, 2006 (JP) ................. 2006-163342

(51) Int. Cl.
*G01F 1/32* (2006.01)
(52) U.S. Cl. ............. 73/861.22; 73/204.22; 73/861.42
(58) Field of Classification Search ........... None
See application file for complete search history.

(56) References Cited

U.S. PATENT DOCUMENTS

| | | | | |
|---|---|---|---|---|
| 4,565,098 A | * | 1/1986 | Herzl | 73/861.22 |
| 7,258,024 B2 | * | 8/2007 | Dimarco et al. | 73/861.22 |
| 7,614,297 B2 | * | 11/2009 | Matsubara | 73/204.19 |
| 7,895,904 B2 | * | 3/2011 | Matsubara et al. | 73/861.22 |

FOREIGN PATENT DOCUMENTS

| | | |
|---|---|---|
| EP | 2028456 A1 * | 2/2009 |
| JP | 7-225141 | 8/1995 |
| JP | 2869054 | 12/1998 |
| JP | 11-281422 | 10/1999 |
| JP | 2000-2567 | 1/2000 |
| JP | 2004-12220 | 1/2004 |
| JP | 2006-29966 | 2/2006 |
| JP | 2007333460 A * | 12/2007 |

OTHER PUBLICATIONS

International Search Report mailed Jul. 3, 2007 for International Application No. PCT/JP2007/059281.

* cited by examiner

*Primary Examiner* — Harshad Patel
(74) *Attorney, Agent, or Firm* — Wenderoth, Lind & Ponack, L.L.P.

(57) ABSTRACT

A multi-vortex flowmeter includes a vortex type detection device including a measurement tube provided in a flow channel to allow a fluid to be measured to pass, a vortex generator provided in the measurement tube to face a flow of the fluid to be measured, and a vortex detector for detecting a change based on a Karman vortex generated by the vortex generator. The flowmeter also includes a thermal type detection device including a temperature sensor and a heating temperature sensor, each protruding into the flow channel, and a flow rate converter, in which a pressure gauge for measuring a pressure in a pipe wired together with the vortex detector and the thermal detection device is provided integrally with the flow rate converter.

8 Claims, 3 Drawing Sheets

MULTI-VORTEX FLOWMETER INTEGRATING PRESSURE GAUGE

TECHNICAL FIELD

The present invention relates to a multi-vortex flowmeter having both a function of a vortex flowmeter and a function of a thermal flowmeter, in particular, to a multi-vortex flowmeter integrating a pressure gauge therein.

BACKGROUND ART

In order to measure a flow rate of a fluid to be measured flowing through a flow tube, a vortex flowmeter and a thermal flowmeter are used.

As is generally known, the vortex flowmeter makes use of the fact that the number of Karman vortexes (vortex frequency) generated by a vortex generator in a unit time is proportional to a flow rate within a predetermined Reynolds number range regardless of whether the vortex generator is a gas or a liquid when the vortex generator is placed in a fluid flow. The constant of proportionality is referred to as the Strouhal number. As vortex detectors, a thermal sensor, a strain sensor, an optical sensor, a pressure sensor, an ultrasonic sensor and the like are given. The above vortex detectors can detect a thermal change, a change in lift or the like caused by the vortexes. The vortex flowmeter is a simple flowmeter capable of measuring a flow rate without being affected by physical properties of the fluid to be measured, and is widely used for flow rate measurement of gases or fluids (for example, see Japanese Patent No. 2869054).

The thermal flowmeter includes a temperature sensor (fluid temperature detecting sensor) and a heating temperature sensor (heating-side temperature sensor). A temperature of the heating temperature sensor (flow velocity sensor (heater)) having a function of a temperature sensor and a function of a heating sensor is controlled to have a constant difference in temperature with respect to a temperature measured by the temperature sensor. This is because a heat quantity, which is removed from a heater when the fluid to be measured is caused to flow, is correlated with a mass flow rate. The mass flow rate is calculated from electric power for heating the heater (for example, see Japanese Patent Application Laid-open No. 2004-12220).

Japanese Patent Application Laid-open No. 2006-29966 discloses a technology of a multi-vortex flowmeter including both the function of the vortex flowmeter and the function of the thermal flowmeter. The multi-vortex flowmeter is capable of measuring a flow rate ranging from an extremely low flow rate to a high flow rate with good accuracy, and is particularly superior to the other flowmeters in this point.

The multi-vortex flowmeter can selectively use the function of the vortex flowmeter and that of the thermal flowmeter according to the condition of a flow of the fluid to be measured flowing through a flow channel of a flow tube. Specifically, the function of the thermal flowmeter is used to perform a measurement in an extremely low flow rate region and a low flow rate region, whereas the function of the vortex flowmeter is used to perform a measurement in a high flow rate region.

Since a sensitivity of the vortex detector is insufficient in the vortex flowmeter when the flow rate is lowered to reduce a vortex differential pressure, control is performed to switch the function to that of the thermal flowmeter at a predetermined lower limit flow rate in the multi-vortex flowmeter.

SUMMARY OF THE INVENTION

The inventor of the present invention has found that a lower limit flow rate serving as a criterion of determination for switching between the functions of the flowmeters can be lowered based on the fact that the vortex differential pressure increases when the pressure in the flow tube increases even at a low flow rate, and intends to reflect the thus found result in the multi-vortex flowmeter. In order to make use of the advantage of the vortex flowmeter, the inventor of the present invention intends to measure the flow rate by using the function of the vortex flowmeter as much as possible. Thus, the inventor of the present invention believes that the multi-vortex flowmeter is required to include a pressure gauge for obtaining a pressure fluctuation in the flow tube.

The present invention is devised in view of the above-mentioned circumstances, and has an object of providing a multi-vortex flowmeter integrating a pressure gauge therein, which serves as an improved multi-vortex flowmeter.

A multi-vortex flowmeter integrating a pressure gauge of the present invention, which has been made in order to solve the above-mentioned problem, is characterized by including vortex type detection means including a measurement tube provided in a flow channel to allow a fluid to be measured to pass, a vortex generator provided in the measurement tube to face a flow of the fluid to be measured, and a vortex detector for detecting a change based on a Karman vortex generated by the vortex generator, thermal type detection means including a temperature sensor and a heating temperature sensor, each protruding into the flow channel, and a flow rate converter, in which a pressure gauge for measuring a pressure in a pipe wired together with the vortex detector and the thermal detection means is provided integrally with the flow rate converter.

According to the present invention having the characteristics as described above, a measurement value of the pressure gauge is loaded into the flow rate converter. As a result, the case where the vortex differential pressure is high even at the low flow rate can be recognized. Therefore, a lower limit flow rate serving as a criterion of determination for switching can be lowered. The pressure gauge integrated with the flow rate converter has advantages in that the effects of disturbance on a wiring or the like are no longer required to be taken into consideration as compared with the case where the pressure gauge is provided independently of the multi-vortex flowmeter. As a result, the detection accuracy or the like can be enhanced. Moreover, the pressure gauge integrated with the flow rate converter has advantages in that setup is facilitated and a pressure can be measured at an optimal position as compared with the case where the pressure gauge is provided independently of the multi-vortex flowmeter.

The multi-vortex flowmeter integrating the pressure gauge of the present invention is characterized by the multi-vortex flowmeter integrating the pressure gauge discussed above, and including an attached measurement pipe for forming the flow channel, in which a pressure measurement portion for introducing a part of the fluid to be measured flowing through the flow channel is formed in the attached measurement pipe, and the pressure gauge is housed in the pressure measurement portion.

According to the present invention having the characteristics as described above, the pressure measurement portion is formed to house the pressure gauge therein. As a result, the pressure can be measured in a state where the detection of a change based on a Karman vortex is not affected.

According to the present invention, the effects of allowing provision of the multi-vortex flowmeter which is remarkably superior to the conventional ones can be obtained. Moreover, according to the present invention, the effects of allowing measurement of the flow rate by using the function of the vortex flowmeter as much as possible can be obtained.

DETAILED DESCRIPTION OF THE INVENTION

Figure 1:
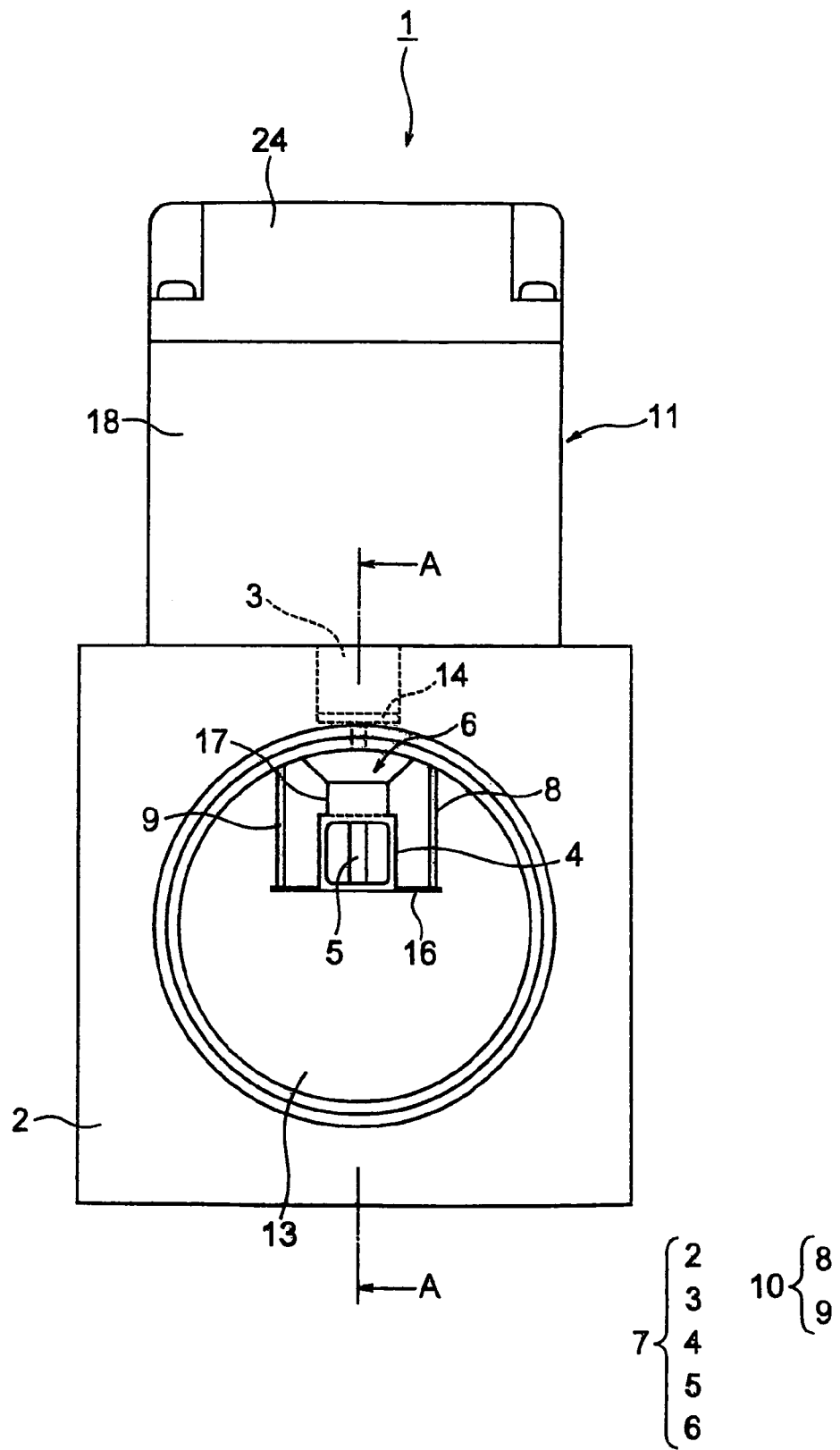
FIG. 1 is a front view illustrating an embodiment of a multi-vortex flowmeter integrating a pressure gauge according to the present invention.
Figure 2:
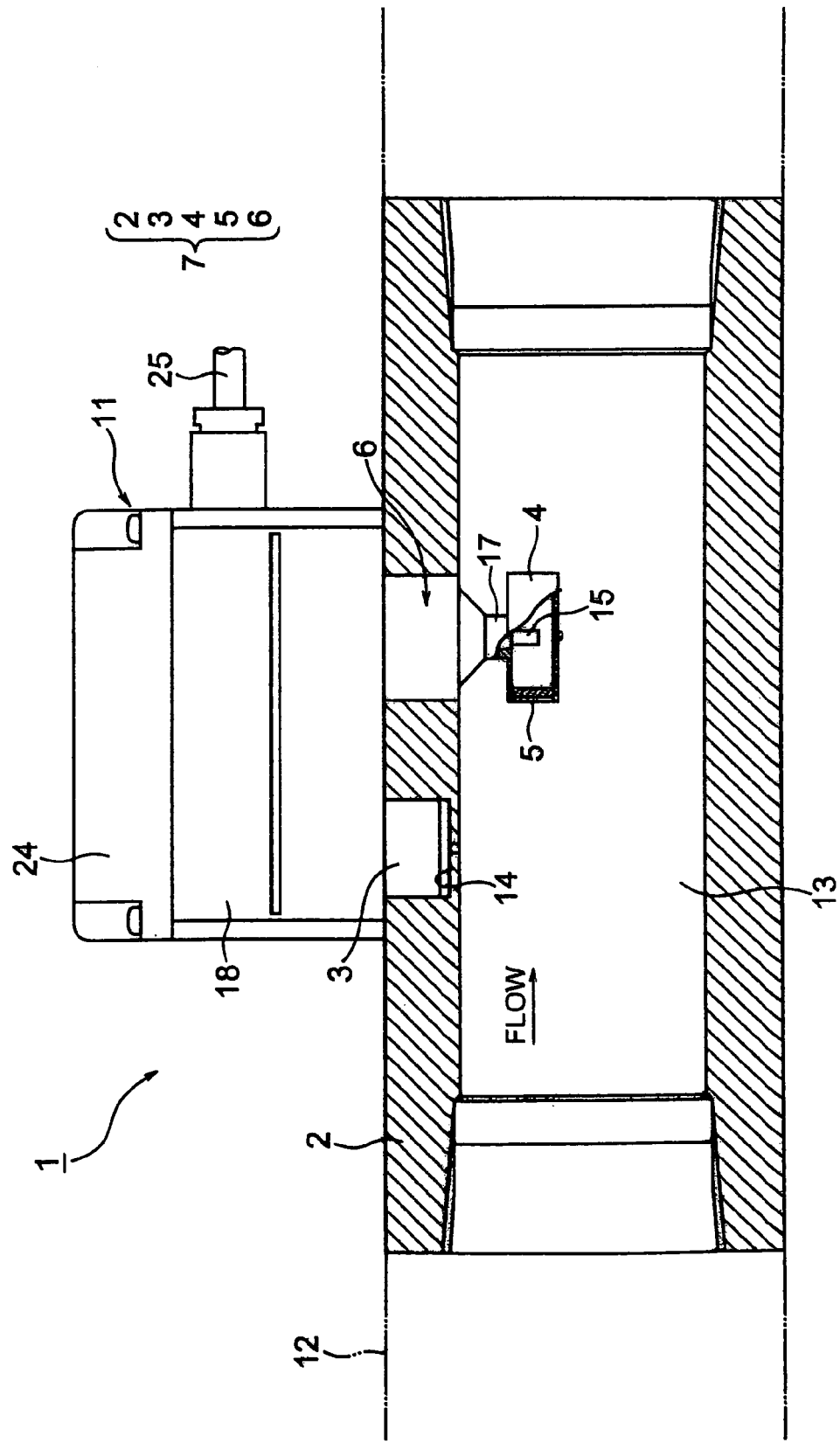
FIG. 2 is a sectional view taken along a line A-A in FIG. 1.
Figure 3:
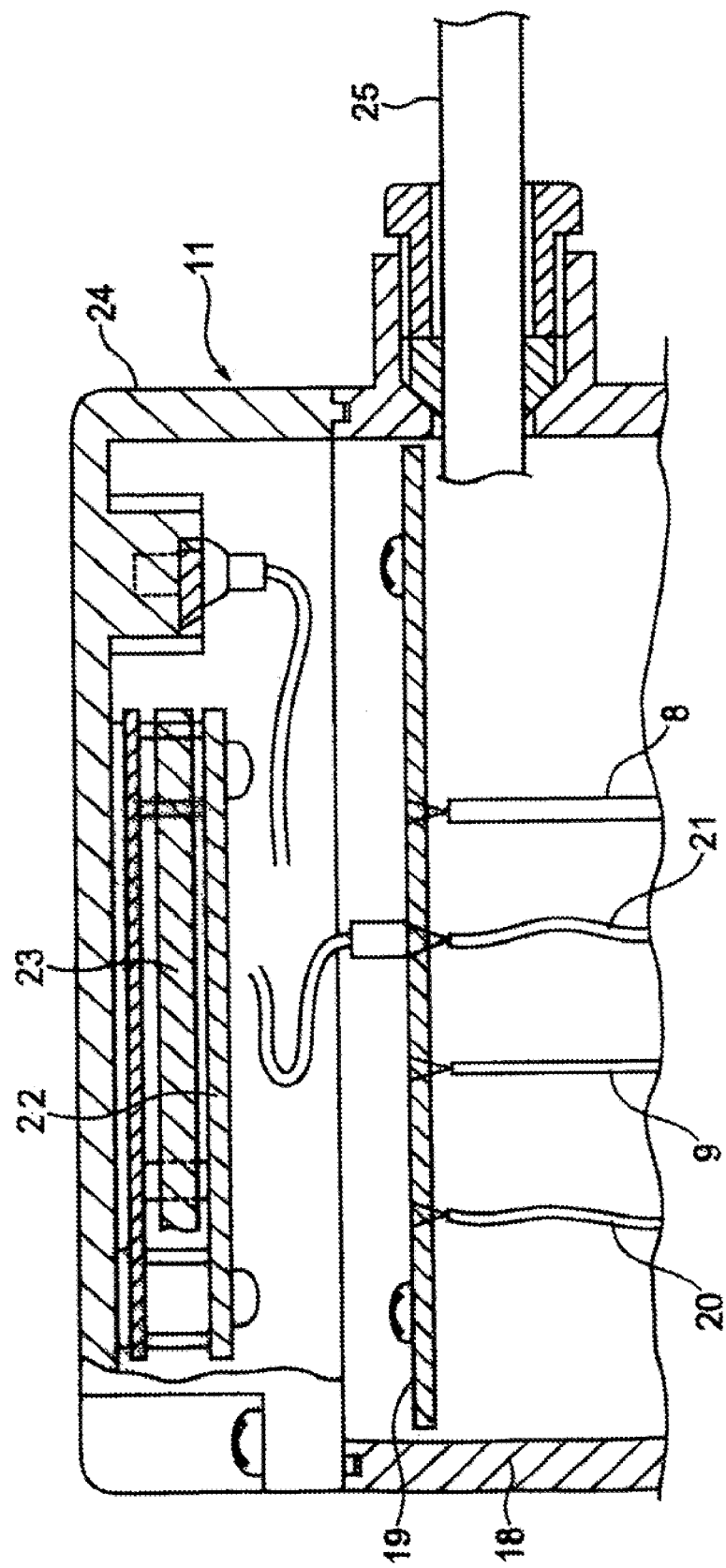
FIG. 3 is a sectional view of a flow rate converter.

Hereinafter, the description is given referring to the accompanying drawings. FIG. 1 is a front view illustrating an embodiment of a multi-vortex flowmeter integrating a pressure gauge according to the present invention. FIG. 2 is a sectional view taken along a line A-A in FIG. 1, and FIG. 3 is a sectional view of a flow rate converter.

In FIGS. 1 and 2, the reference numeral 1 denotes a multi-vortex flowmeter (multi-vortex flowmeter integrating a pressure gauge) according to the present invention. The multi-vortex flowmeter 1 is configured to have both a function of a vortex flow meter and a function of a thermal flowmeter. As described below, the multi-vortex flowmeter 1 is configured to have a structure to allow a lower limit flow rate serving as a criterion of determination for switching to be lowered. The multi-vortex flowmeter 1 includes vortex type detection means 7 having an attached measurement pipe 2, a pressure gauge 3, a measurement tube 4, a vortex generator 5 and a vortex detector 6, thermal type detection means 10 having a temperature sensor 8 and a heating temperature sensor 9, and a flow rate converter 11 for calculating a flow velocity or a flow rate of a fluid to be measured (illustration omitted) based on output signals from the vortex type detection means 7 and the thermal type detection means 10. Hereinafter, each of the configurations is described referring to FIGS. 1 through 3.

The attached measurement pipe 2 is removably attached in the middle of a flow tube 12 (the position of attachment is not limited to the middle of the flow tube 12, but can also be an end thereof), and is formed as, for example, a cylindrical structure as illustrated, which forms a flow channel 13 therein. A joint is formed on each of the ends of the attached measurement pipe 2. On an outer part of the attached measurement pipe 2 as described above, the flow rate converter 11 is fixed by appropriate means. The flow channel 13 formed in the attached measurement pipe 2 is formed to have a circular cross section. Through the flow channel 13, a fluid to be measured flows in a direction indicated by an arrow.

In the middle of the flow channel 13, the measurement tube 4, the temperature sensor 8, and the heating temperature sensor 9 are provided. At the upstream of the measurement tube 4 and the like and in the vicinity of the measurement tube 4, a pressure measurement portion 14 is formed (the arrangement is only given by way of example). The pressure gauge 3 is attached to the pressure measurement portion 14 to be housed therein. The pressure measurement portion 14 includes a part for housing the pressure gauge 3 and a part for introducing a part of the fluid to be measured flowing through the flow channel 13. The pressure gauge 3 serves to measure a pressure of the fluid to be measured flowing through the flow channel 13, and a known pressure gauge is used in this case (however, is compatible with the flow rate converter 11). The pressure gauge 3 is attached to the flow rate converter 11 to be integrated therewith. The pressure gauge 3 is integrated with the flow rate converter 11 at a position slightly away from the vortex detector 6, the temperature sensor 8, and the heating temperature sensor 9 toward the upstream side.

The measurement tube 4 is cylindrically formed to have a rectangular tube cross section (the shape is given only by way of example). The measurement tube 4 is formed to extend in the direction indicated by the arrow in which the fluid to be measured flows. In a part of the measurement tube 4, through which the fluid to be measured flows, the vortex generator 5 and a pressure sensing plate 15 described blow, which is positioned at the downstream of the vortex generator 5, are provided. A temperature sensor retaining portion 16 for retaining a tip of the temperature sensor 8 and that of the heating temperature sensor 9 is provided (although the temperature sensor retaining portion is integrally formed in this embodiment, the configuration is not limited thereto). The measurement tube 4 is fixed to the vortex detector 6 through a connecting cylindrical part 17. In this embodiment, the vortex detector 6, to which the measurement tube 4 is connected, is removably mounted to the attached measurement pipe 2.

The vortex generator 5 is a part for generating a vortex in the measurement tube 4, and its shape is set to face the flow of the fluid to be measured. In this embodiment, the vortex generator 5 is formed to have a triangle pole shape (the shape is given only byway of example; several examples are disclosed in Japanese Patent No. 2869054 corresponding to Patent Document 1). The vortex generator 5 is provided for an opening portion of the measurement tube 4, from which the fluid to be measured flows into the measurement tube. The vortex generator 5 is provided to be situated in the center of the opening portion of the measurement tube 4.

The vortexes generated by the vortex generator 5 are now described. The vortexes are separated from a position where a large change in momentum is caused by the flow of the fluid to be measured along the vortex generator 5, which flows into the opening portion of the measurement tube 4. When the cross section of the vortex generator 5 is a triangle as in this embodiment, an edge of the triangle serves as a point of separation. The vortexes separated from the vortex generator 5 to flow out are alternately generated in a zigzag manner according to the Karman's stable vortex condition to flow out while forming vortex streets maintaining a fixed inter-vortex distance and a fixed inter-street distance. The inter-vortex distance is obtained by the number of vortexes generated per unit time, that is, a vortex frequency, and a flow velocity per unit time, which is calculated, for example, based on the flow rate obtained from the fluid having flowed into a reference container such as a reference tank within a predetermined time.

The temperature sensor retaining portion 16 is formed to horizontally protrude from lower walls of the measurement tube 4, in other words, to protrude from both side walls of the measurement tube 4. Although not particularly limited, the temperature sensor retaining portion 16 is formed to have a triangular shape in plan view. The temperature sensor retaining portion 16 is formed as if the measurement tube 4 is provided with fins. Into the vicinity of the triangle top portion of the temperature sensor retaining portion 16 as described above, the tip of each of the temperature sensor 8 and the heating temperature sensor 9 is fitted straight.

The vortex detector 6 is a sensor for detecting the vortex, and a pressure sensor is used in this case. The vortex detector 6 includes the pressure sensing plate (sensor pressure sensing plate) 15 provided in the measurement tube 4 at the downstream of the vortex generator 5 and a pressure detection element plate provided inside the vortex detector 6, and is configured to detect a fluctuating pressure (alternating pressure) based on the Karman vortexes generated by the vortex generator 5 with the pressure detection element plate through the pressure sensing plate 15. The vortex detector 6 is attached to be integrated with the flow rate converter 11 in this embodiment.

The vortex type detection means 7 is provided to obtain the flow velocity or the flow rate of the fluid to be measured flowing through the attached measurement pipe 2. The flow velocity or the flow rate of the fluid to be measured flowing through the attached measurement pipe 2 can be obtained by calculating the flow velocity or the flow rate of the fluid to be measured flowing through the measurement tube 4 as a partial flow velocity or a partial flow rate in the attached measurement pipe 2. This is based on the fact that the total flow rate can be estimated as long as the flow is uniform even if the measurement is performed not on the entire cross section of the attached measurement pipe 2 but on a part thereof. Specifically, a flow velocity distribution of a rectified fluid flowing through a straight tube is given as a function of the Reynolds number. Therefore, the flow velocity at a position at a certain distance away from a central portion of the attached measurement pipe 2 can be converted into an average flow velocity in the attached measurement pipe 2.

Known sensors are used as both the temperature sensor 8 and the heating temperature sensor 9 constituting the thermal type detection means 10. A specific description of the configuration is herein omitted. The temperature sensor 8 in this embodiment is a bar-shaped temperature sensor. The heating temperature sensor 9, which is also bar-shaped, is a flow velocity sensor (heater) having the function of a temperature sensor and a function of a heating sensor. In this embodiment, the temperature sensor 8 and the heating temperature sensor 9 are attached to the flow rate converter 11 to be integrated therewith.

The temperature sensor 8 and the heating temperature sensor 9 protrude into the flow channel 13 of the attached measurement pipe 2, and the forefront portions thereof are retained by the temperature sensor retaining portion 16. The respective temperature sensing portions of the temperature sensor 8 and the heating temperature sensor 9 are provided in the vicinity of the measurement tube 4. With the vortex detector 6, the temperature sensor 8 and the heating temperature sensor 9 are arranged in a horizontal row (the arrangement is only given by way of example; another arrangement is possible as long as the vortex detection is not affected). The respective temperature sensing portions of the temperature sensor 8 and the heating temperature sensor 9 may be further increased in length to protrude from the temperature sensor retaining portion 16 toward the center of the flow channel 13 (in order to avoid the effects of heat conducted from outside to the attached measurement pipe 2).

The flow rate converter 11 includes a converter case 18. In the converter case 18, an amplifier board 19 including a configuration such as a microcomputer or the like is provided. A transmission line 20 of the pressure gauge 3, the respective leads of the temperature sensor 8 and the heating temperature sensor 9, and a transmission line 21 of the vortex detector 6 are connected to the amplifier board 19 (the arrangement of the temperature sensor 8 and the heating temperature sensor 9 is illustrated with a modification in FIG. 3 for convenience; the temperature sensor and the heating temperature sensor are arranged at a position rotated by 90 degrees in practice, and the temperature sensor and the heating temperature sensor are arranged with the transmission line 21 of the vortex detector 6 in a direction at a right angle with respect to a paper plane in FIG. 3).

The temperature sensor 8, the heating temperature sensor 9, and the transmission lines 20 and 21 are drawn into the converter case 18. The temperature sensor 8, the heating temperature sensor 9, and the transmission lines 20 and 21 are drawn into the converter case 18 without being exposed to the exterior. The temperature sensor 8, the heating temperature sensor 9, the pressure gauge 3, the vortex detector 6, and the amplifier board 19 have the functions as a flow rate measurement portion and a flow rate computing portion.

On an opening portion of the converter case 18, a converter cover 24 including a switch board 22 and a display board 23 is mounted through a packing (the reference numeral omitted). A transmission cable 25 is connected to one side wall of the converter case 18.

In the above-mentioned configuration and structure, the multi-vortex flowmeter 1 of the present invention allows the selective use of the function of the vortex flowmeter and the function of the thermal flowmeter according to the condition of the flow of the fluid to be measured flowing through the flow channel 13 of the attached measurement pipe 2. Specifically, the function of the thermal flowmeter is used to perform a measurement in an extremely low flow rate range and a low rate range, whereas the function of the vortex flowmeter is used to perform a measurement in a high flow rate range. In the multi-vortex flowmeter 1 of the present invention, the high flow rate range measurement with the function of the thermal flowmeter and the low flow rate range measurement with the function of the vortex flowmeter overlap each other to some extent. The switching is performed by the flow rate converter 11.

First, an operation for measurement of the extremely low flow rate range or the low flow rate range, specifically, an operation for measurement by using the function of the thermal flowmeter is described. The heating temperature sensor 9 measures a flow rate based on a temperature detected by the temperature sensor 8. Specifically, in the flow rate measurement portion and the flow rate computing portion in the flow rate converter 11, the heating temperature sensor 9 is heated (a current is caused to flow) to set a fixed difference in temperature (for example, +30° C.) between the temperature sensor 8 and the heating temperature sensor 9, and a mass flow rate is calculated from a current value for the heating. After being converted into a predetermined unit, the calculated mass flow rate is displayed on a display portion provided on an upper part of the converter cover 24 or is transmitted through the transmission cable 25 to be displayed on a display device not illustrated.

The additional description of the calculation of the mass flow rate will now be given. When the fluid to be measured (illustration omitted) is caused to flow in the direction indicated by the arrow, the heating temperature sensor 9 is cooled by the fluid to be measured. In order to control the difference in temperature with the temperature sensor 8 to a fixed value, it is necessary to cause a further current to flow through the heating temperature sensor 9. It is known that the current flowing through the heating temperature sensor 9 is proportional to the mass flow rate at this time, and the mass flow rate is calculated by using this fact.

Next, an operation for the measurement by using the function of the vortex flowmeter is described. A fluctuation pressure (alternating pressure) based on the Karman vortexes generated by the vortex generator 5 is detected by the pressure sensing plate 15 and the pressure detection element plate. Then, the flow velocity or the flow rate of the fluid to be measured flowing through the measurement tube 4 is calculated from a detection value obtained by the vortex detector 6 as a partial flow velocity or a partial flow rate in the attached measurement pipe 2 to calculate the flow velocity or the flow rate (volume flow rate) of the fluid to be measured flowing through the attached measurement pipe 2. After being converted into a predetermined unit, the calculated flow velocity or flow rate is displayed on the display portion provided in the upper part of the converter cover 24 or is transmitted through the transmission cable 25 to be displayed on the display device not illustrated.

For the switching between the functions of the flowmeters performed in the flow rate converter 11, a measurement value from the pressure gauge 3 is loaded into the flow rate converter 11. Inconsideration of the thus loaded measurement value, the switching from the function of the thermal flowmeter to the function of the vortex flowmeter or from the function of the vortex flowmeter to the function of the thermal flowmeter is performed. For example, the vortex differential pressure increases as the pressure in the attached measurement pipe 2 increases even at the low flow rate. Based on this fact, the lower limit flow rate serving as the criterion of determination for switching from or to the thermal flowmeter is lowered. The switching is performed based on the lowered lower limit flow rate.

As described above referring to FIGS. 1 to 3, according to the present invention, the multi-vortex flowmeter 1 remarkably superior to the conventional ones can be provided. The multi-vortex flowmeter 1 is capable of measuring the flow rate of the fluid to be measured, which ranges from zero or the extremely low flow rate to the high flow rate, with good accuracy.

Several further effects of the multi-vortex flowmeter 1 according to the present invention are enumerated. Since the pressure gauge 3 is integrated with the flow rate converter 11 while the pressure gauge 3 is wired to the flow rate converter 11 together with the temperature sensor 8, the heating temperature sensor 9 and the vortex detector 6, piping and wiring structures can be simplified as compared with the case where the pressure gauge is provided independently of the multi-vortex flowmeter 1. Moreover, as can be seen from the illustrated state, the transmission line 20 of the pressure gauge 3 is not exposed to the exterior. Therefore, the flowmeter is resistant against the disturbance to be unlikely to cause erroneous detection. Furthermore, by integrating the pressure gauge 3 with the flow rate converter 11, setup is facilitated and the pressure can be measured in the vicinity of the measurement tube 4, in other words, at an optimal position, as compared with the above-mentioned case where the pressure gauge is provided independently.

In the case where the pressure gauge is provided independently, there is a possibility that a process which may affect a dynamic pressure is performed during an operation for independently providing the pressure gauge. In the present invention, however, the pressure gauge 3 is integrated with the attached measurement pipe 2 in advance. Therefore, the process which may affect the dynamic pressure is not performed.

Besides, it is apparent that various modifications are possible without changing the scope of the present invention.

The invention claimed is:

1. A multi-vortex flowmeter integrating a pressure gauge, comprising:
   an attached measurement pipe having a flow channel formed therein;
   vortex type detection means comprising:
      a measurement tube provided in the flow channel, the measurement tube having a rectangular tube cross-section and extending in a direction in which a fluid to be measured flows, for allowing the fluid to be measured to pass;
      a vortex generator that is provided in a part of the measurement tube through which the fluid to be measured flows, the vortex generator facing a flow of the fluid to be measured and being provided in a center of an opening portion of the measurement tube from which the fluid to be measured flows in; and
      a vortex detector comprising a pressure sensing plate provided in the measurement tube downstream of the vortex generator and a pressure detection element plate embedded inside the pressure sensing plate, for detecting a change based on a Karman vortex generated by the vortex generator by detecting a fluctuating pressure based on the Karman vortex with the pressure detection element plate through the pressure sensing plate;
   thermal type detection means comprising a temperature sensor formed of a bar-shaped temperature sensor and a heating temperature sensor formed of a bar-shaped flow velocity sensor functioning as a temperature sensor and a heating sensor, each being provided perpendicular to a flowing direction of the flow channel; and
   a flow rate converter comprising a converter case and an amplifier board having a configuration of a microcomputer inside the converter case, wherein
   the attached measurement pipe has a pressure measurement portion formed upstream of the measurement tube and in a vicinity thereof,
   the pressure measurement portion comprises a part for housing the pressure gauge and a pressure sensing port for introducing a part of the fluid to be measured flowing through the flow channel, and
   the pressure gauge wired together with the vortex detector and the thermal type detection means, for measuring a pressure of the fluid to be measured flowing through the flow channel, is provided integrally with the flow rate converter at a position away from the vortex detector, the temperature sensor, and the heating temperature sensor toward an upstream side of the multi-vortex flowmeter.

2. A multi-vortex flowmeter comprising:
   an attached measurement pipe having a flow channel formed therein;
   a vortex detection unit including:
      a measurement tube provided in the flow channel, the measurement tube having a through-hole extending in a direction in which a fluid to be measured flows to allow the fluid to be measured to flow through the through-hole;
      a vortex generator provided in the through-hole of the measurement tube through which the fluid to be measured flows; and
      a vortex detector for detecting a change based on a Karman vortex generated by the vortex generator by detecting a fluctuating pressure based on the Karman vortex;
   a thermal detector including a temperature sensor and a heating temperature sensor, each protruding into the flow channel;
   a pressure gauge; and
   a flow rate converter for calculating a flow rate of the fluid to be measured based on at least one of (i) an output of the vortex detector and (ii) an output of the thermal detector.

3. The multi-vortex flowmeter according to claim 2, wherein the flow rate converter switches between calculating the flow rate from the output of the vortex detector or the output of the thermal detector based on a value from the pressure gauge.

4. The multi-vortex flowmeter according to claim 2, wherein the measurement tube has a rectangular cross-section.

5. The multi-vortex flowmeter according to claim 2, wherein the temperature sensor and the heating temperature sensor are bar-shaped sensors.

6. The multi-vortex flowmeter according to claim 2, wherein the vortex detector includes a pressure sensing plate provided in the measurement tube downstream of the vortex generator.

7. The multi-vortex flowmeter according to claim 2, wherein the pressure gauge is located upstream of the measurement tube.

8. The multi-vortex flowmeter according to claim 2, wherein the temperature sensor and the heating temperature sensor each protrude into the flow channel in a direction that is perpendicular to the direction in which the fluid to be measured flows.

* * * * *